United States Patent Office 2,887,366
Patented May 19, 1959

2,887,366
RESURFACING OF FIBER-REINFORCED RESINOUS ARTICLES

Paul E. Oberdorfer, Jr., Claymont, Del., assignor to E. I. du Pont de Nemours and Company, Wilmington, Del., a corporation of Delaware No Drawing. Application June 6, 1955
Serial No. 513,569

4 Claims. (Cl. 41—41)

This invention relates to surfacing of resin-impregnated fibrous articles, especially treatment of surface fibers of a resin-reinforcing structure.

An increasingly frequent type of construction, commonly termed "reinforced plastic" or "plastic laminate," consists essentially of one or more layers of fibrous filler and a resinous binder occupying the interstices formed by the component fibers. A conventional combination of this kind employs glass fibers to reinforce a polyester resin, and recently various synthetic organic fibers have found a place in such structures. However, although the surface of a glass-reinforced plastic laminate can be sanded smooth, non-brittle fibers customarily leave a fine nap or fuzz on the surface; this surface fuzz renders painting of the surface difficult and unsatisfactory, and the surface tends to show the fiber pattern at high humidity.

A primary object of the present invention is smoothing of the surface of a reinforced plastic containing synthetic organic fibers. Another object is improved surfacing of plastic laminates having component synthetic organic fibers in a surface layer. Other objects of this invention, together with methods for attaining the various objects, will be apparent from the following description.

In general, the objects of the present invention are accomplished by applying to the surface of an article having a resin-impregnated fibrous filler a substance that is a solvent for surface fibers thereof but inert toward the resin itself. The invention comprehends particularly the steps of raising a fuzz of non-brittle fibers on the surface of a resin-reinforcing fibrous filler, wiping the surface with a liquid in which the fibers are soluble and the resin is insoluble, and subsequently removing excess liquid therefrom. The practice of this invention is exemplified below in illustrative detail.

Example I

A needled batt weighing 3.9 ounces per square yard and composed of cellulose acetate fibers is placed on top of 4 plies of a commercial (Bigelow-Sanford Co.) needled glass mat weighing 18 oz./sq. yd. as a surface overlay to form an assembly 2 inches thick. (The term "needled" indicates that some of the component fibers have been oriented forcibly in a direction perpendicular to the top surface of the fibrous mat or batt.) The whole fibrous material is impregnated with a thermosetting polyester molding and laminating resin containing styrene monomer known to the trade as "Vibrin 119" (U.S. Rubber Co.), and the resin is cured in conventional manner by molding the resulting structure under heat and pressure to a final thickness of about ⅛ inch. The top surface of the molded article is sanded briskly by hand, raising a minute fuzz of acetate fibers thereon. The surface is wiped with an acetone-moistened cloth, resulting in a considerably improved appearance; under the microscope no protruding long lengths or stubs of fibers are visible, and the surface appears non-porous and free of surface irregularities. The surface is primed and painted to a high finish without difficulty.

On an identical article prepared in like manner a finish was obtained without the use of a primer coat by spraying directly with a commercial lacquer having a base of cellulose nitrate. This ease of finishing indicated absence of the usual air bubbles found in most laminates, which if originally present here apparently were sealed over by the solvent wiping.

Example II

A laminated article ⅛ inch thick is prepared by the procedure of Example I, using the same kind of underlying glass mat and the same type of polyester resin as impregnant but a different overlay. This overlying batt has a bonded non-woven structure in which fibers composed of polyethylene terephthalate predominate; this was prepared by carding together 15% by weight of "Vinyon" (HH) vinyl chloride/vinyl acetate copolymer staple fibers (3 denier, 3 inch, softening point 77° C.) with 85% by weight of polyethylene terephthalate staple (3 denier, 3 inch) and then calendering the carded material on heated rolls at a fabric temperature of approximately 77° C.–93° C. in order to fuse the vinyl copolymer filler. After the curing step, the top surface of the article is sanded with a soft-back waterproof paper surfaced with silicon carbide and known to the trade as "Wet-or-Dry Trimite" (Minnesota Mining and Manufacturing Co.) to raise a surface fuzz of polyethylene terephthalate, and the resulting fuzzy surface is dipped into a vessel containing trifluoroacetic acid for about a minute. Upon removal from the liquid, the surface is wiped smooth and then is rinsed clean with water. The surface is found to be smooth and free from the fuzz raised by sanding, being suitable for painting directly.

Example III

A laminated article ⅛ inch thick is prepared by the procedure of Example I except that the overlying layer of the reinforcing filler is composed of polyacrylonitrile staple fibers in the form of a needled batt weighing 10 oz./sq. yd. and the impregnating resinous binder is the commercially available thermosetting polyester type molding and laminating resin containing styrene monomer known as "Plaskon" 941 (Libby-Owens-Ford Co.). Similar sanding of the surface of the cured laminate results in removal of some long fibers but produces a fine fuzzy appearance. The surface is wiped with ethylene carbonate, rinsed with water and dried, whereupon the surface is seen to be free of all of the protruding fibers not previously sanded off. Surface-priming shows no evidence of fiber protuberances.

In a laminate similar to that prepared above except that the glass mat was omitted, being replaced by an equal amount of needled polyacrylonitrile batt, similar results were obtained; the surface was smooth and glossy when painted with a blue enamel applied directly to the sanded surface.

Attempts to bring about a satisfactory surface appearance by passing a flame over various articles prepared as in the above examples failed because of fusing and beading of the fibers and, in the extreme, physical distortion of the surface. The surface fuzz from articles prepared according to the above examples also could not be removed by subsequent sanding with abrasives of finer texture or grit size, a fine fuzz remaining after numerous sandings.

The above examples indicate that smooth surfaces are obtained by wiping with a solvent for three-denier fillers in the top layer of the reinforced plastic. Fibers in the size range below one denier provide very smooth surfaces with a minimum of solvent treatment and often can be finished to a high gloss with only one coat of paint or the like. Fibers in the range above ten denier often require intensive wiping with one or more applications of solvent to provide a smooth surface; large fibers (e.g., in the vicinity of one hundred denier) may be employed purposely in the surface layer to provide a wrinkle surface that may be finished in conventional manner with the usual thinned quick-drying lacquers. Various etched and other novel effects can be obtained by suitable adjustment of amount and time of solvent application to surfaces of plastic laminates of selected fiber content.

As shown in the examples, the fibrous filler may be composed of two or more kinds of fibers intermingled in a single layer or either together or separate in two or more layers, several layers being customary in the construction of most reinforced plastics. The use of non-woven structures is exemplified because laying up strips of woven fabrics in similar fashion is accomplished even more readily; of course, the impregnation may be accomplished in more than one step, at successive stages in assembly, regardless of the kind(s) of reinforcing fibers.

The fibers in the surface layer may be in the form of staple or continuous filaments, or both, in non-woven or woven (including knitted) form and may be composed of one or more of a wide variety of polymers, among which are the following: cellulosics, including regenerated celluloses, and esters, ethers, and similar derivatives of cellulose; acrylonitrile polymers, including polyacrylonitrile and copolymers of acrylonitrile, especially with other ethylenically unsaturated monomers; other vinyl polymers, including polyvinyl acetate and polyvinyl chloride; polyvinylidene chloride and other vinylidene polymers; polyamides, including polyhexamethylene adipamide and sebacamide, also polycaprolactam; polyethylene, and other polymerized hydrocarbons or halogenated derivatives thereof.

Upon sanding or other mild abrasive treatment of plastic laminates reinforced with these fibers, protruding lengths of fiber are removed close to the surface of the article, leaving a residue of fiber fuzz or nap, as indicated above. The abrasion may be performed by power-driven tools, rather than manually; however, care should be taken not to heat the abraded article so much as to exceed melting or softening temperatures of either the fibers or the resin, with consequent distortion of the surface whose smoothing is intended. The temperature of the treated article preferably does not rise appreciably above room temperature.

Suitable solvents for the above and other fibers will come readily to mind, most of which may be applied advantageously according to this invention at room temperature. For example, cellulose acetate fibers may be treated with acetone, polyacrylonitrile fibers with ethylene carbonate, polyamide fibers with formic acid or metacresol, polyethylene terephthalate fibers with trifluoroacetic acid or chlorinated phenols, polyvinyl chloride fibers with acetone, polyvinyl alcohol fibers with water, and regenerated cellulose fibers with a mixture of formic acid and calcium chloride. Wiping an excess of solvent on the surface promotes sealing of pores and covering or filling of surface indentations. Removal of residual solvent from the treated article may be hastened by blowing, evacuating, heating, or washing the surface before subsequent finishing.

Of course, a suitable combination of resinous binder and reinforcing fibers will be selected to permit removal of the fibrous surface fuzz by application of a substance that does not affect the resin disadvantageously, as by degrading or dissolving it. The exemplified polyester resin may be supplanted by any of many well-known thermosetting polyesters, alkyd resins, urea-formaldehyde, melamine-formaldehyde, and phenol-formaldehyde resins; as well as thermoplastic acrylic resins, polyethylene, polystyrene, polyamides, polyesters, and the like. Solubility characteristics of these materials are well known, as are methods for preparing them and laminates based upon them. The practice of the present invention does not require non-conventional shaping or curing techniques or conditions of temperature, pressure, or cycling in the formation of the article to be surfaced.

The advantages of preparing the surfaces of reinforced plastics according to this invention lie not only in provision of clean smooth surfaces easily painted without previous priming but also in reduction of need for preliminary and subsequent sanding or other smoothing treatment, precluding the expensive multiple sanding and painting steps customary when glass fibers are present at the surface. Other benefits of its practice will be apparent to those undertaking to finish such articles as automobile bodies, boat hulls, trailer truck housings, radio cabinets, cafeteria trays, toys, and the like.

The claimed invention:

1. Process comprising abrading the surface of an article composed of resinous binder and fibrous filler, thereby leaving a fuzz of non-brittle component fibers on the surface of the article, applying to the surface of the article a substance that is a solvent for the fiber but a non-solvent for the reinforced resin, whereby the fuzz disappears therefrom and the surface is microscopically smooth, and subsequently removing residual solvent therefrom.

2. The process of claim 1 in which the temperature of the article surface remains at essentially room temperature.

3. Process comprising raising by abrasion a fuzz of synthetic organic fibers on the surface of a resin-reinforcing fibrous filler, wiping the surface with a liquid in which the fibers are soluble and the reinforced resin insoluble, and subsequently removing excess of the liquid therefrom, whereby the surface thereof is rendered microscopically smooth and non-porous.

4. Process of claim 3 in which the fibrous filler is partly glass.

References Cited in the file of this patent

UNITED STATES PATENTS

| | | |
|---|---|---|
| 741,047 | Klepper | Oct. 13, 1903 |
| 1,783,608 | Ellis et al. | Dec. 2, 1930 |
| 2,002,083 | Dreyfus | May 21, 1935 |
| 2,069,501 | Miller | Feb. 2, 1937 |
| 2,297,204 | Deissner | Sept. 29, 1942 |
| 2,651,811 | Coney | Sept. 15, 1953 |